US007089259B1

(12) United States Patent
Kouznetsov et al.

(10) Patent No.: US 7,089,259 B1
(45) Date of Patent: Aug. 8, 2006

(54) SYSTEM AND METHOD FOR PROVIDING A FRAMEWORK FOR NETWORK APPLIANCE MANAGEMENT IN A DISTRIBUTED COMPUTING ENVIRONMENT

(75) Inventors: Victor Kouznetsov, Aloha, OR (US); Michael Chin-Hwan Pak, Portland, OR (US); Daniel J. Melchione, Beaverton, OR (US); Ian Shaughnessy, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 362 days.

(21) Appl. No.: 10/056,702

(22) Filed: Jan. 25, 2002
(Under 37 CFR 1.47)

Related U.S. Application Data

(60) Provisional application No. 60/309,835, filed on Aug. 3, 2001, provisional application No. 60/309,858, filed on Aug. 3, 2001.

(51) Int. Cl.
*G06F 17/30* (2006.01)
(52) U.S. Cl. .......... 707/102; 707/101; 707/103 X; 707/104.1; 709/220; 709/222; 709/223
(58) Field of Classification Search ............... 709/220, 709/222, 223; 717/173; 707/101, 102, 103 X, 707/104.1; 714/4; 713/182
See application file for complete search history.

(56) References Cited

U.S. PATENT DOCUMENTS

| 5,974,454 | A | * | 10/1999 | Apfel et al. ............... 709/221 |
| 5,978,912 | A | * | 11/1999 | Rakavy et al. ................ 713/2 |
| 6,123,737 | A | * | 9/2000 | Sadowsky ................... 717/173 |
| 6,256,668 | B1 | * | 7/2001 | Slivka et al. ............... 709/220 |
| 6,345,294 | B1 | * | 2/2002 | O'Toole et al. ............. 709/222 |
| 6,658,585 | B1 | * | 12/2003 | Levi ............................. 714/4 |
| 6,757,723 | B1 | * | 6/2004 | O'Toole et al. ............. 709/222 |
| 6,993,657 | B1 | * | 1/2006 | Renner et al. .............. 713/182 |
| 2002/0184619 | A1 | * | 12/2002 | Meyerson ................... 717/173 |
| 2003/0028624 | A1 | * | 2/2003 | Hasan et al. ................ 709/220 |
| 2006/0031454 | A1 | * | 2/2006 | Ewing et al. ............... 709/223 |

OTHER PUBLICATIONS

"Understanding UPnP (TM): A Whitepaper" Jun. 2000, UPnP (TM) Forum, 39 pages, available online at <http://www.upnp.org/resources/whitepapers.asp>.*
"Plug-In Guide" Jan. 1998, Netscape Communications (TM), TOC has 4 pages, Chapter 1 has 14 pages, Reference has 19 pages, available online at <http://developer.netscape.com/docs/manuals/communicator/plugin/index.htm>.*

* cited by examiner

*Primary Examiner*—Thuy N. Pardo
(74) *Attorney, Agent, or Firm*—Zilka-Kotab, PC; Christopher J. Hamaty

(57) ABSTRACT

A system and method for providing a framework for network appliance management in a distributed computing environment is disclosed. A status report periodically received from each of a plurality of network appliances is recorded. Each status report contains health and status information and application-specific data for each network appliance. Configuration settings for each network appliance progressively assembled concurrent to providing installable components are maintained. A catalog listing currently installable components for each network appliance based on the configuration settings is dynamically provided.

47 Claims, 14 Drawing Sheets

SYSTEM AND METHOD FOR PROVIDING A FRAMEWORK FOR NETWORK APPLIANCE MANAGEMENT IN A DISTRIBUTED COMPUTING ENVIRONMENT

CROSS-REFERENCE TO RELATED APPLICATIONS

This patent application is a conversion of U.S. provisional patent applications, Ser. No. 60/309,835, filed Aug. 3, 2001, pending; and Ser. No. 60/309,858, filed Aug. 3, 2001, pending; the priority dates of which are claimed and the disclosures of which are incorporated by reference.

FIELD OF THE INVENTION

The present invention relates in general to secure network appliance management and, in particular, to a system and method for providing a framework for network appliance management in a distributed computing environment.

BACKGROUND OF THE INVENTION

Enterprise computing environments generally include both localized intranetworks of interconnected computer systems and resources internal to an organization and geographically distributed internetworks, including the Internet. Intranetworks make legacy databases and information resources available for controlled access and data exchange. Internetworks enable internal users to access remote data repositories and computational resources and allow outside users to access select internal resources for completing limited transactions or data transfer.

Increasingly, network appliances, or simply "appliances," are being deployed within intranetworks to compliment and extend the types of services offered. As a class, network appliances have closed architectures and often lack a standard user interface. These devices provide specialized services, such as electronic mail (email) anti-virus scanning, content filtering, file, Web and print service, and packet routing functions.

Ideally, network appliances should be minimal maintenance devices, which are purchased, plugged into a network, and put into use with no further modification or change. Analogous to a cellular telephone, a network appliance should ideally provide the service promised without requiring active management by individual users or administrators.

Nevertheless, regular maintenance of networks appliance is necessary to ensure continued optimal performance. Operating system and application programs must be installed upon appliance installation and following any type of crash or abnormal service termination. As well, each appliance must be configured, preferably automatically, to comply with applicable security and administration policies. Moreover, as bug fixes and enhancements become available, installed programs must be updated with patches, which must first be obtained from the appropriate sources and then installed on each individual device.

One common problem in maintaining network appliances is the increased workload imposed on individual servers to support appliance maintenance. The health and status of each appliance must be regularly monitored by a server to ensure proper performance and function. Accordingly, individual server loads increase with the addition of each new appliance. The tracking and management of configurations of individual appliances can become resource intensive, particularly in a large scale network environment containing numerous network appliances.

In the prior art, "push" solutions have been used to manage individual network appliances, whereby changes in configurations and programs are sent to individual appliances from a centralized server as necessary. The server stores each appliance configuration and lists names and versions of programs installed. Periodically, the server polls the pool of appliances to ascertain status and health and pushes new updates out to individual appliances as necessary. However, push solutions are resource intensive and can exact a high performance load on each server. Moreover, servers can fail to detect misconfigurations of appliances erroneously tracked with incorrect configurations.

Therefore, there is a need for an approach to providing autonomous network appliance configuration and management without requiring an active centralized server. Preferably, such an approach would utilize "pull" downloads of needed updates and would further lodge configuration and management responsibilities on individual appliances.

There is a further need for an approach to maintaining the health and status of individual appliances through periodic client-centric reporting. Preferably, such an approach would use a secure "heartbeat" automatically generated by individual appliances to report configuration and status information. As well, each responsible server would preferably generate an alert whenever a heartbeat report was not timely received.

There is a further need for an approach to providing distributed staging of program updates for network appliances. Preferably, such an approach would provide centralized component download management with the capability to instruct requesting appliances to redirect and download software updates from proxy component servers.

SUMMARY OF THE INVENTION

The present invention provides a system and method for autonomously managing the configuration of network appliances deployed in a distributed network environment. Each network appliance executes an installed set of packages and files. Periodically, the appliance awakens to send a report to a network operations center to describe the current health and status of the appliance and provide application-specific data. The network appliance then obtains a catalog of up-to-date packages and files dynamically generated by a catalog server for that appliance. As necessary, the appliance requests and installs any updated packages and files from a component server. Each package includes self-installing instructions and is authenticated and decrypted prior to installation. Each file is received over a secure connection and is installed per instructions stored in a file information subdirectory at the networks operations center.

An embodiment of the present invention provides a system and a method for providing a framework for network appliance management in a distributed computing environment. A status report periodically received from each of a plurality of network appliances is recorded. Each status report contains health and status information and application-specific data for each network appliance. Configuration settings for each network appliance progressively assembled concurrent to providing installable components are maintained. A catalog listing currently installable components for each network appliance based on the configuration settings is dynamically provided.

A further embodiment provides a system and method for autonomously managing a network appliance deployed within a distributed computing environment. An internal catalog of components installed on one such network appliance is maintained, identified by component and version. A status report containing health and status information and application-specific data is periodically provided for the one such network appliance. A catalog of currently installable components dynamically generated for the one such network appliance is obtained. Non-current components are determined by comparing the components and versions listed in the obtained catalog against the internal catalog.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
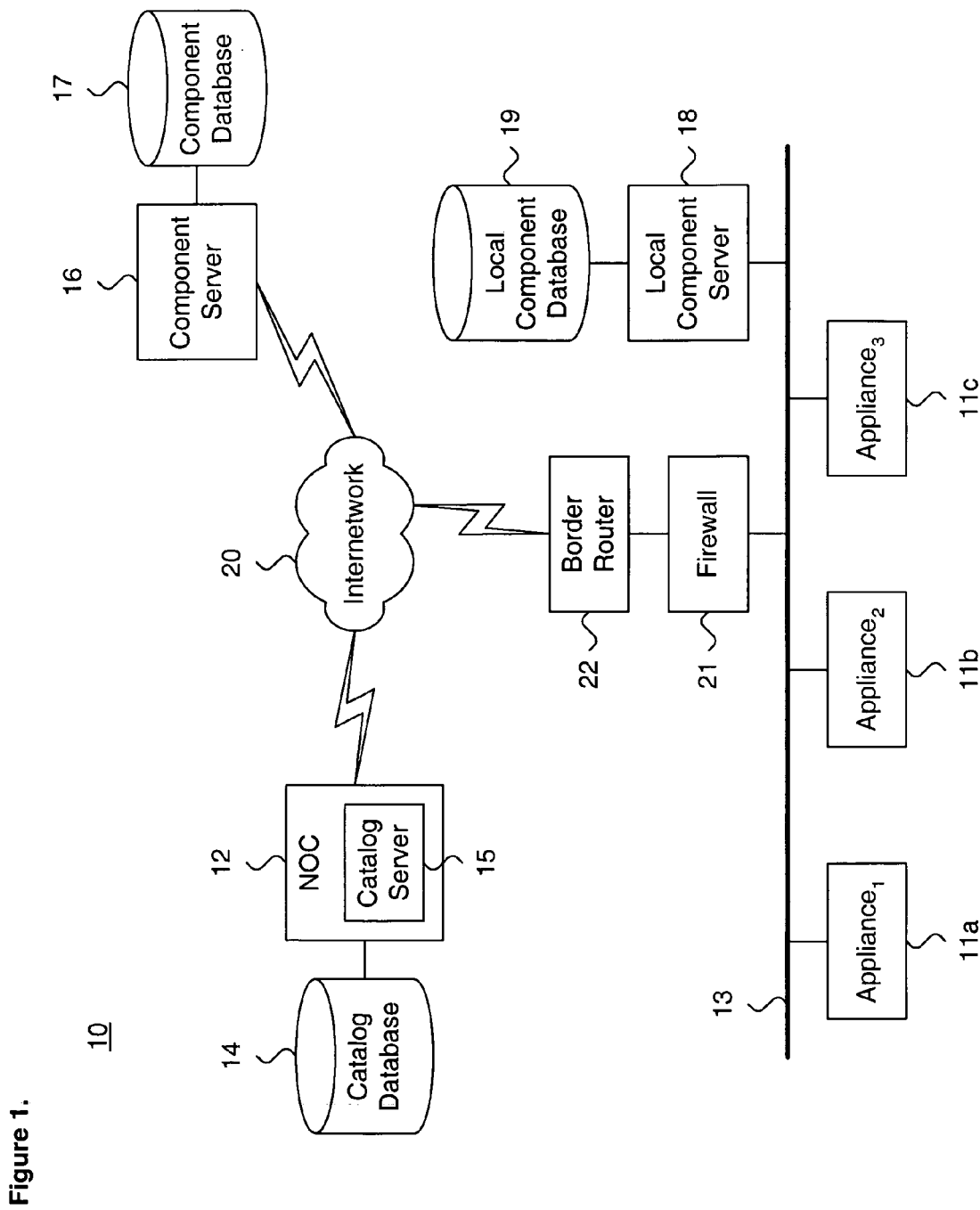
FIG. 1 is a block diagram showing a system for providing a framework for network appliance configuration management.

FIG. 1 is a network diagram 10 showing a system for providing a framework for network appliance management in a distributed computing environment, in accordance with the present invention. The distributed computing environment is preferably TCP/IP compliant. A plurality of individual network appliances (or simply "appliances") 11*a–c* are interconnected via an intranetwork 13. Each of the appliances 11*a–c* is autonomously managed and provides specified functionality, such as electronic mail (email) anti-virus scanning, content filtering, packet routing, or file, Web, or print service. Other forms of appliance services are feasible, as would be recognized by one skilled in the art.

In addition to providing the specified functionality, the various appliances 11*a–c* are autonomously self-configured and self-managed, as further described below with reference to FIG. 3. Each appliance 11*a–c* periodically generates reports on status and health and provides application-specific data, known as "SecureBeats," to a centralized network operations center (NOC) 12. Each appliance 11*a–c* then obtains a catalog from a catalog server 15 operating on the network operations center 12. As necessary, packages and files are obtained from a component server 16, or alternatively, local component server 18. Packages and files are updated whenever the downloaded catalog indicates that a currently installed package or file is out of date.

Each appliance 11*a–c* is interconnected via an intranetwork 13 which is, in turn, interconnected to an internetwork 20, including the Internet, via a firewall 21 and border router 22. The local component server 18 is also interconnected via the intranetwork 13 and shares the same network domain with the appliances 11*a–c*. The network operations center 12 and component server 16 are external to the intranetwork 13 and are only accessible as remote hosts via the internetwork 20. Accordingly, the reporting and catalog functions are transacted with each appliance 11*a–c* in a secure session, preferably using the Secure Hypertext Transport Protocol (HTTPS). Furthermore, as further described below with reference to FIG. 2, the file download function must also be transacted in a secure session. Other network configurations, topologies and arrangements of clients and servers are possible, as would be recognized by one skilled in the art.

Each appliance 11*a–c* maintains an internal catalog listing the packages and files currently installed. Immediately upon being interconnected to the intranetwork 13, each appliance 11*a–c* is remotely configured using a Web browser-based configuration, which installs the various packages and files providing the specific functionality of the appliance, such as described in commonly-assigned related U.S. patent application Ser. No. 10/057,709, filed Jan. 25, 2002, pending, the disclosure of which is incorporated by reference.

On a regular periodic basis, each appliance 11*a–c* awakens and contacts the network operations center (NOC) 12 to upload the status report. Alternatively, the network operations center 12 can broadcast a "ping" query message to all appliances 11*a–c* to wake up each appliance 11*a–c* and trigger a status report upload. Next, each appliance 11*a–c* contacts the catalog server 15 to retrieve a copy of a catalog of the most-up-to-date packages and files currently available. The catalog server 15 executes as part of the network operations center 12 and maintains a catalog database 14. The catalog server 15 dynamically generates a catalog for each requesting appliance 11*a–c* based on the type and configuration of appliance.

Upon receiving the catalog from the catalog server 15, the appliance 11*a–c* determines whether updates to the configuration or installed applications are necessary. Updates are effected by downloaded components which include packages and files. If an update is required, the appliance 11*a–c* requests and "pulls" the identified packages and files from the component server 16 or, alternatively, the local component server 18, for download. The component server 16 and local component server 18 maintain databases, component database 17 and local component database 19, respectively, in which the most-up-to-date packages and files are stored. The appliance 11*a–c* downloads the required packages and files for subsequent installation.

In a further embodiment, the functionality of the network operations center 12 and component server 16 can be combined into a single server (not shown) or implemented on separate systems for each of the network operations center 12, catalog server 15, and component server 16. The use of separate servers for publishing the catalog and providing component downloads of packages and files allows finer-grained distributed processing of network appliance configuration and management.

Individual packages and files are optionally staged for download by a local component server 18 interconnected via the intranetwork 13. The close proximity of the local server 18 to the appliances 11a–c allows for faster and more convenience component downloads and avoids bandwidth congestion at the border router 22.

The individual computer systems, including servers and clients, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs and data, are loaded into the RAM for execution and processing by the CPU and results are generated for display, output, transmittal, or storage.

Figure 2:
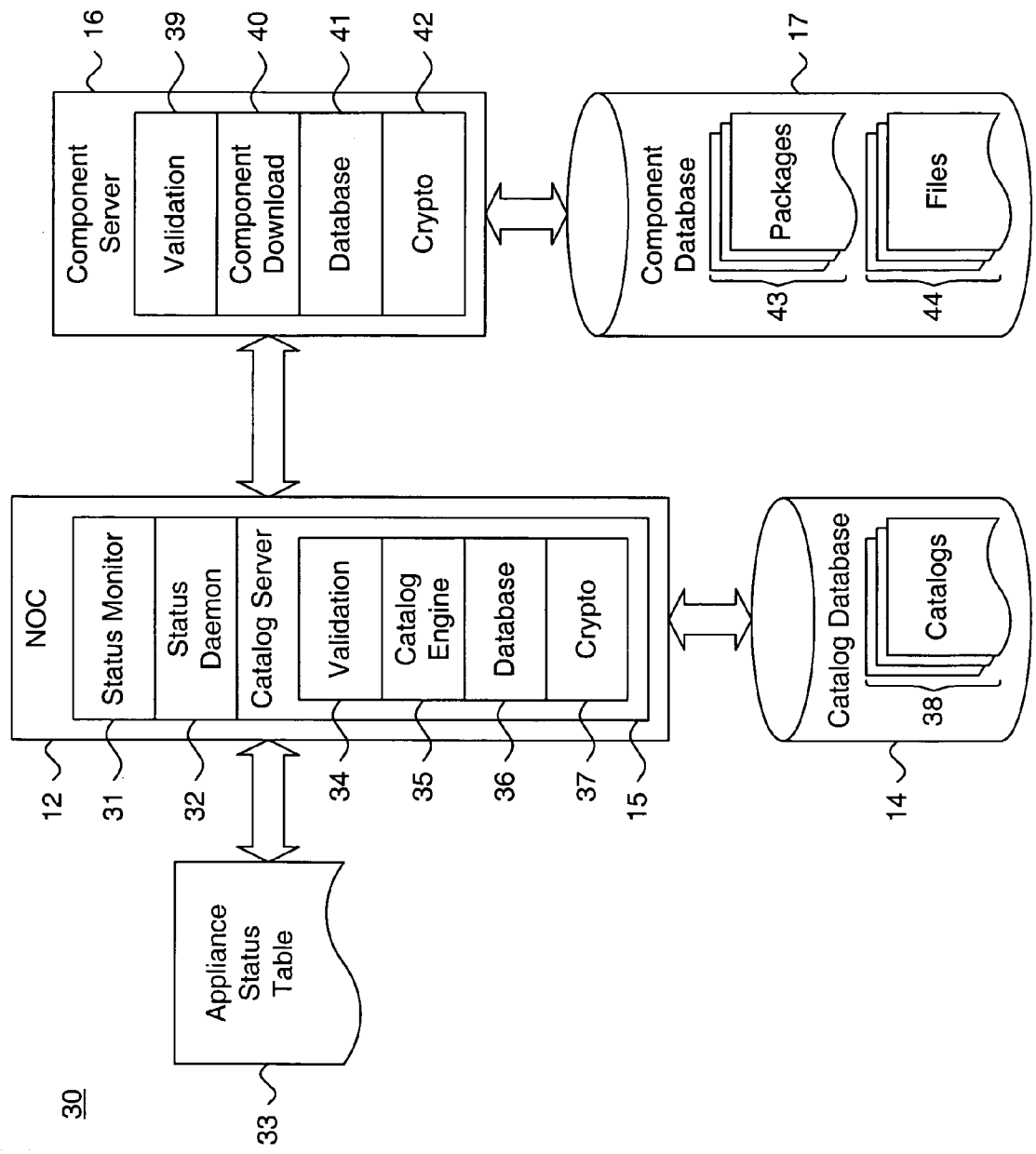
FIG. 2 is a block diagram showing the software modules of the individual servers comprising the system of FIG. 1.

FIG. 2 is a block diagram showing the software modules 30 of the individual servers comprising the system 10 of FIG. 1. The servers include the network operations center 12, catalog server 15 and component server 16, plus local component server 18.

The network operations center 12 includes two modules: status monitor 31 and status daemon 32. The catalog server 15 executes as part of the network operations center 12. The status monitor 31 receives the periodic status reports from the individual network appliances 11a–c (shown in FIG. 1), as further described below with reference to FIG. 7. Each status report is recorded and registered in an appliance status table 33, which notes the appliance user identifier (UID) and time of each report.

The status daemon 32 executes as an independent process that periodically awakens and examines the appliance status table 33 to determine whether any of the appliances 11a–c have failed to report, as further described below with reference to FIG. 13. As necessary, an alert is generated to inform an administrator of a potentially faulty appliance.

The catalog server 15 includes four modules: validation 34, catalog engine 35, database 36, and crypto 37. The validation module 34 validates catalog requests received from individual appliances 11a–c. In the described embodiment, each appliance 11a–c sends a user identifier (UID) as part of each catalog request, which is used to validate the identity of the requesting appliance.

The catalog engine 35 dynamically generates catalogs 38 listing the most-up-to-date packages and files for download on an individual appliance basis. In the described embodiment, the catalogs 38 are generated in the Extensible Markup Language (XML), although any other form of catalog description could also be used. The catalog engine 35 refers to the appliance status table 33 to determine the current configuration of each appliance.

The database module 36 interfaces to the main database 14 to access the catalogs 38 maintained therein. In the described embodiment, the main database 14 is a structured query language (SQL) based database. The catalog information is stored as structured records indexed by user identifiers.

The crypto module 37 provides asymmetric (public key) and symmetric encryption. Both forms of cryptography are needed to transact a secure session with each appliance 11a–c. As well, the network operations center 12 uses the crypto module 37 to digitally sign and encrypt packages that are staged in the component database 17 and local component database 19 (both shown in FIG. 1).

The component server 16 includes four modules: validation 39, component download 40, database 41 and 42. The validation module 40 validates component requests received from individual appliances 11a–c. In the described embodiment, each appliance 11a–c sends a user identifier (UID) as part of each component request, which is used to validate the identity of the requesting appliance.

The component download module 40 downloads requested packages 43 and files 44 to validated network appliances 11a–c. The component download module 40 records the names and versions of applications installed on each network appliance 11a–c by maintaining a set of configuration settings (not shown) for each network appliance 11a–c progressively assembled concurrent to the downloading of each requested package 43 and file 44. Accordingly, the persistent configured state and applications suite installed on a network appliance 11a–c could be completely restored by the component server 16, should the set of installed applications on any given network appliance 11a–c become corrupt or rendered otherwise unusable through a catastrophic crash or service termination.

As further described below with reference to FIG. 4, each package 43 contains an encrypted self-contained set of installable software digitally signed by the network operations center 12. Packages can be downloaded in now-secure sessions. Files 45 are not signed or encrypted and must be downloaded in secure sessions. The installation location on a given appliance 11a–c is determined by the instructions encoded in a file-information subdirectory on the network operations center 12.

The database module 41 interfaces to the component database 17 to access the packages 43 and files 44 maintained therein. In the described embodiment, the component database 17 is a structured query language (SQL) based database.

The crypto module 42 provides asymmetric (public key) and symmetric encryption. Both forms of cryptography are needed to transact a secure session with each appliance 11a–c.

The functionality of the local component server 18 and local component database 19 is substantially identical to that of the component server 16 and component database 17. The only distinction between the two component servers is the location of each within the system 10 of FIG. 1. The local component server 18 effectively functions as a proxy component server by staging components for convenient download by locally proximate network appliances.

In addition, the functionality of the network operations center 12, catalog 15 and component server 16 could be combined into a single integrated server or provided as separate systems deployed in various locations and combinations throughout the intranetwork 13 and internetwork 20, as would be recognized by one skilled in the art.

Figure 3:
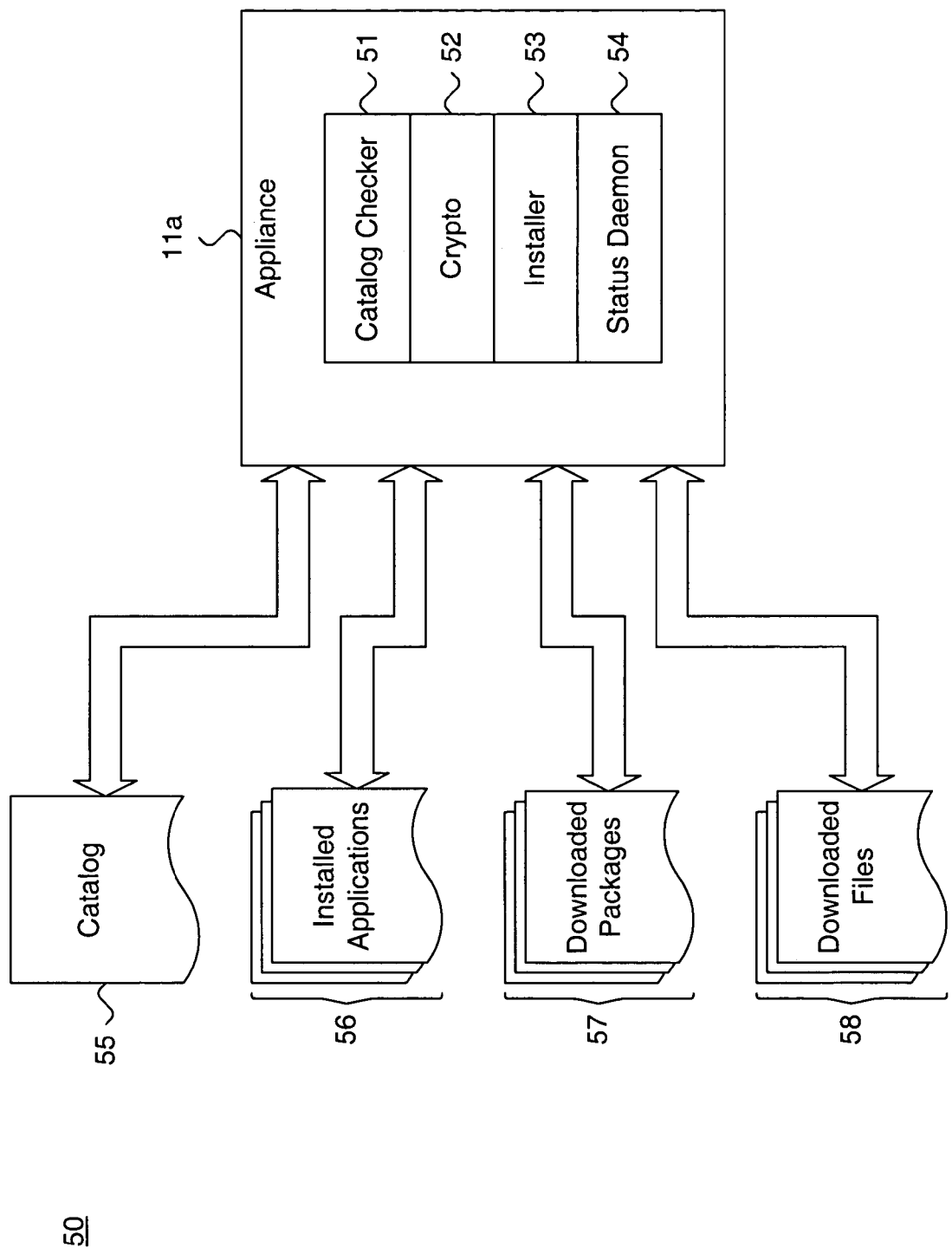
FIG. 3 is a block diagram showing the software modules of an exemplary network appliance of FIG. 1.

FIG. 3 is a block diagram showing software modules 50 of an exemplary network appliance 11a of FIG. 1. Application-specific logic has been omitted for clarity. As pertains to autonomous configuration and management, each network appliance 11a includes four modules: catalog checker 51, crypto 52, installer 53, and status daemon 54. The catalog checker 51 requests and examines a catalog returned from the catalog server 15 (shown in FIG. 1) to determine whether software updates are required. Each downloaded catalog, catalog.new, is checked against an internal catalog 55, catalog.cur. The internal catalog 55 lists the installed applications 56 currently used by the appliance 11*a*. Required packages 57 and files 58 are downloaded or "pulled" from the component server 16. The installed applications 56 include both the functional programs implemented on each network appliance 11*a–c* to perform the application-specific logic for a given function, as well as operating system and support software, including the software modules 50. Accordingly, the autonomous configuration and self-management of each network appliance 11*a–c* can enable a vendor to provide a complete service model whereby updates and device recovery is handled automatically and without end-user intervention.

The crypto module 52 provides asymmetric (public key) and symmetric encryption. Both forms of cryptography are needed to transact a secure session with the network operations center 12 and component server 16. Public key encryption is also used to authenticate and decrypt downloaded packages 57.

The installer 53 installs downloaded packages 57 and files 58. Each individual package 57 includes as complete setup program, as further described below with reference to FIG. 5. Each file 58 must be installed in a location identified in a corresponding file information subdirectory, fileinfo, on the network operations center 12.

Finally, the status daemon 54 periodically awakens and sends a report of the health and status of the network appliance 11*a* to the network operations center 12. The status report identifies the reporting appliance 11*a* and provides machine-specific data, including the load on the processor, available disk space application-specific information, such as the number of emails passing through the device. The status report is referred to as a "SecureBeat."

Each software module of the individual servers and exemplary appliance 11*a* is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The individual servers and exemplary appliance 11*a* operate in accordance with a sequence of process steps, as further described beginning below with reference to FIG. 6.

Figure 4:
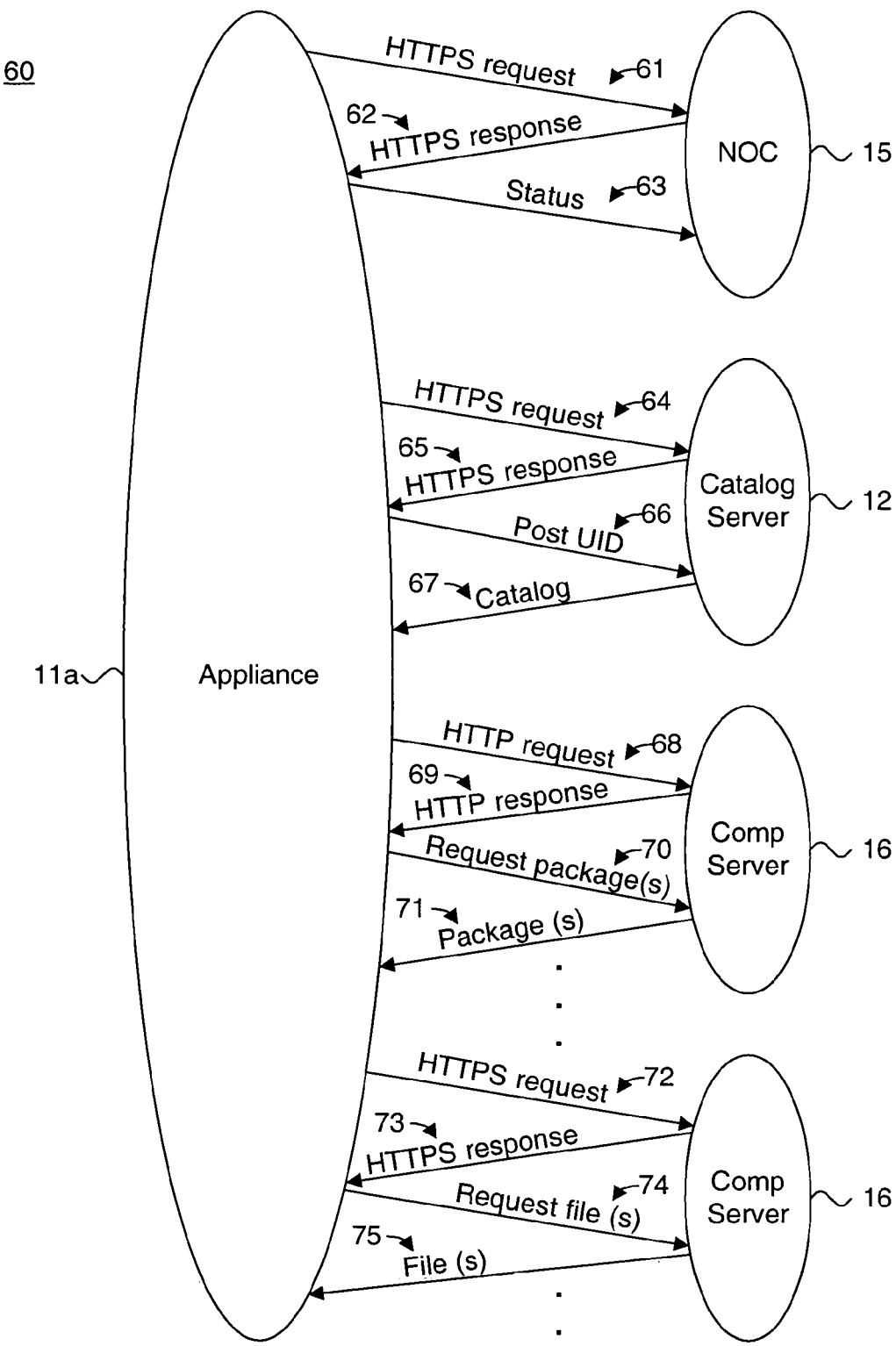
FIG. 4 is a process flow diagram showing remote network appliance management, as performed by the system of FIG. 1.

FIG. 4 is a process flow diagram showing remote network appliance management, as performed by the system of FIG. 1. Each network appliance 11*a–c* is autonomously managed. Management requires two mandatory phases, status reporting (step 61–63) and catalog examination (step 64–67), and two optional phases, package downloading (steps 68–71) and file downloading (steps 72–75).

During the status reporting phase, the appliance 11*a* requests a secure session, preferably using HTTPS (step 61). Upon the creation of a secure session (step 62), the appliance 11*a* sends a status report to the network operations center 12 (step 63). The status report is then logged by the network operations center 12.

During the catalog examination phase, the appliance 11*a* requests a secure session, preferably using HTTPS (step 64). Upon the creation of a secure session (step 65), the appliance 11*a* posts a user identifier (UID) (step 66). The catalog server 15 validates the identity of the requesting appliance 11*a* and, if valid, archives that the particular appliance 11*a* has connected at the current time in the appliance status table 33 (shown in FIG. 2). The catalog server 15 then downloads the catalog to the requesting appliance 11*a* (step 67).

The package downloading and file downloading phases are performed when the appliance 11*a* determines that an installed application 56 (shown in FIG. 3) is out of date. During the package downloading phase, the appliance 11*a* requests a non-secure session (step 68). Upon the creation of a non-secure session (step 69), the appliance 11*a* requests the necessary packages (step 70). The component server 16 validates the identity of the requesting appliance 11*a* by examining the package request. Each package request includes a user identifier (UID) and uniform resource locator (URL) indicating the location of the required package. The package is then downloaded to the requesting appliance 11*a* (step 71) for installation.

After receiving each package, the requesting appliance 11*a* clarifies that the package has been signed with the appropriate private key for the network operations center 12 using public key authentication. The package downloading phase (steps 70–71) is repeated until all required packages have been downloaded.

During the file downloading phase, the appliance 11*a* requests a secure session, preferably using HTTPS (step 72). Upon establishing a secure session (step 73), the appliance 11*a* requests the necessary files (step 74). The component server 16 validates the identity of the requesting appliance 11*a* by examining the file request. Each file request includes a user identifier (UID) and uniform resource located (URL) indicating the location of the required file. The file is then downloaded to the requesting appliance 11*a* (step 75) for installation.

After receiving each file, the requesting appliance 11*a* installs the downloaded file based on installation instructions found in the file information subdirectory on the network operations center 12. The file downloading phase (steps 74–75) is repeated until all required files have been downloaded.

In the described embodiment, the package downloading (steps 68–71) and file downloading (steps 72–75) phases must occur in sequential order. Individual packages can contain placeholder files that must be overwritten by appliance-specific files following package installation. To allow such appliance-specific dependencies, the packages must generally be installed first.

Figure 5:
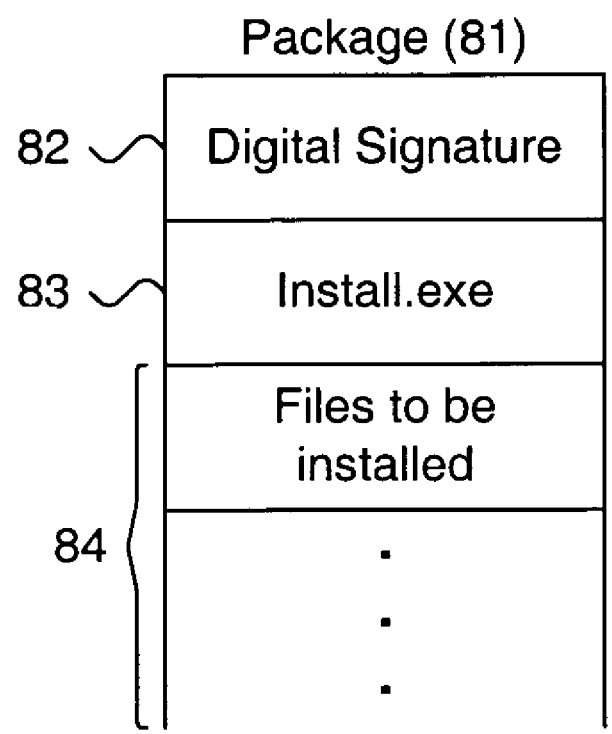
FIG. 5 is a data structure diagram showing a package maintained by the component server of FIG. 2.

FIG. 5 is a data structure diagram 80 showing a package 81 maintained by the component server 16 of FIG. 1. Each package 81 includes a digital signature 82 that authenticates the package as having originated with the network operations center 12. Only those packages 81 containing a properly-authenticated digital signature are installed by the individual network appliances 11*a–c* (shown in FIG. 1). Each package 81 also includes an executable program 83, install.exe, which is executed by the appliance 11*a–c* to effect the installation of the package 81. Finally, each package contains the individual files to be installed 84 by the executable program 83.

Unlike packages, each file does not contain specific instructions for installation. Instead, the installing appliance 11*a–c* looks up the appropriate instructions in a specific file information subdirectory, called fileinfo, located on the network operations center 12. In the described embodiment, the subdirectory is located under $USER/SecureBeat/Upload/Application-Name, where $USER is a root directory and Application-Name refers to an installed application 56 (shown in FIG. 3).

For example, to update a virus screening application, the subdirectory would be "$USER/SecureBeat/Upload/V-Screen" and the configuration file would be vscreen.upload.comp. The contents of a sample configuration file are as follows:

<UPLOAD DIR="VSCREEN" SERVER="BWSH">

The tag UPLOAD indicates the file is located in the subdirectory called "VSCREEN" and is to be retrieved from the server "BWSH."

Figure 6:
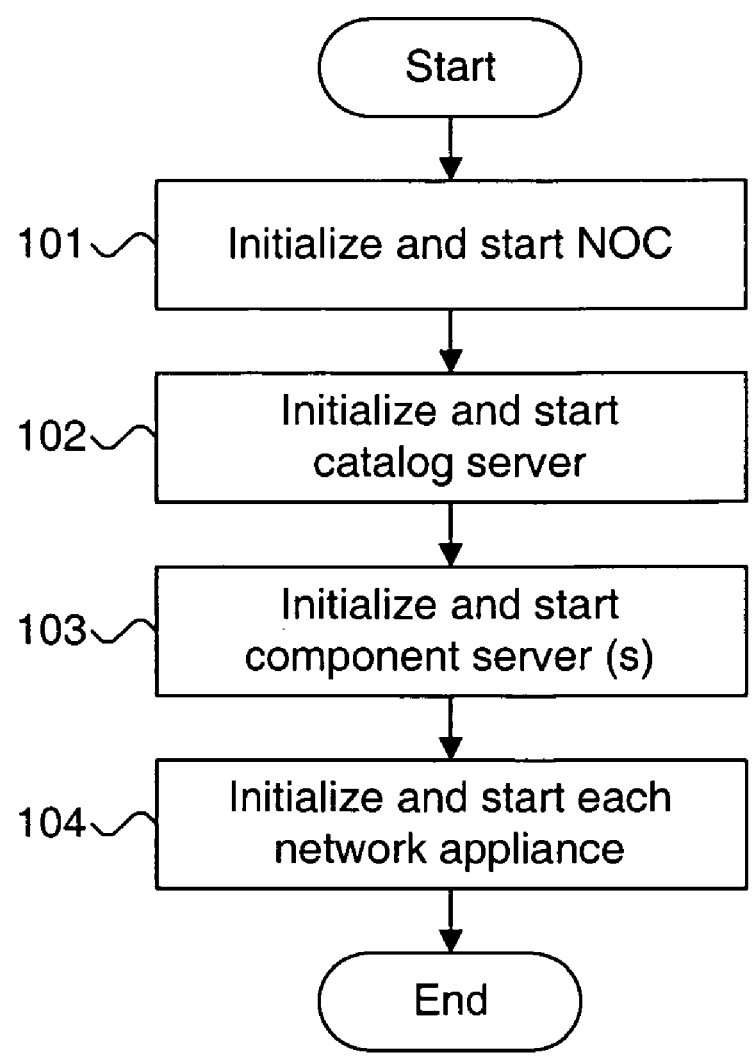
FIG. 6 is a flow diagram showing a method for providing a framework for network appliance management, in accordance with the present invention.

FIG. 6 is a flow diagram 100 showing a method for providing a framework for network appliance management, in accordance with the present invention. The individual components, including network operations center 12, catalog server 15, component server 16 and individual network appliances 11a–c, execute independently. Each of the components must be initialized and started (blocks 101–104) prior to appliance management. Upon respective initialization and starting, each component proceeds independently, as further described below with reference to FIGS. 7–10.

Figure 7:
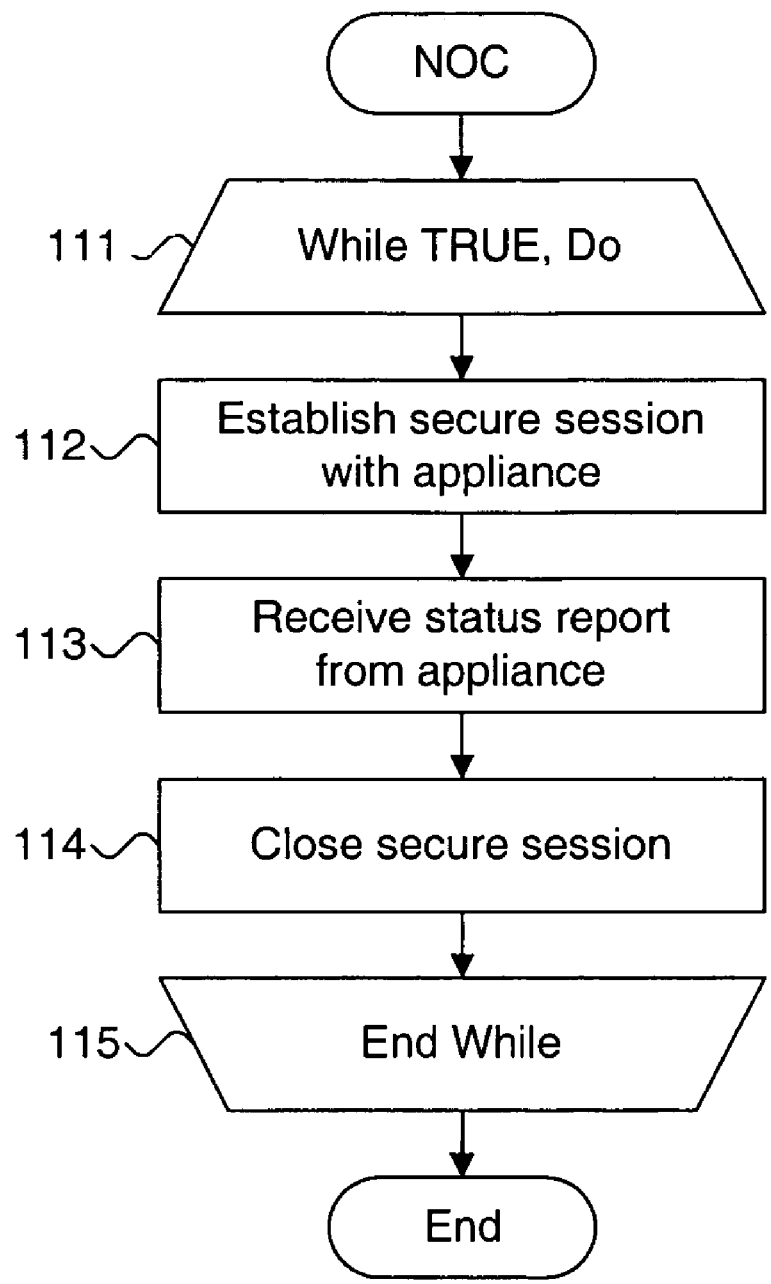
FIG. 7 is a flow diagram showing the process performed by the network operations center of FIG. 2.

FIG. 7 is a flow diagram 110 showing the process performed by the network operations center 12 of FIG. 2. The network operations center 12 executes an iterative processing loop (blocks 111–115). During each iteration (block 111), a secure session is established with a requesting appliance (block 112). Upon establishing a secure session, a status report is received from each appliance (block 113), after which the secure session is closed (block 114). During the secure session, the appliance reports the health and status of the machine. Processing continues (block 115) until the process is terminated or halted.

Figure 8:
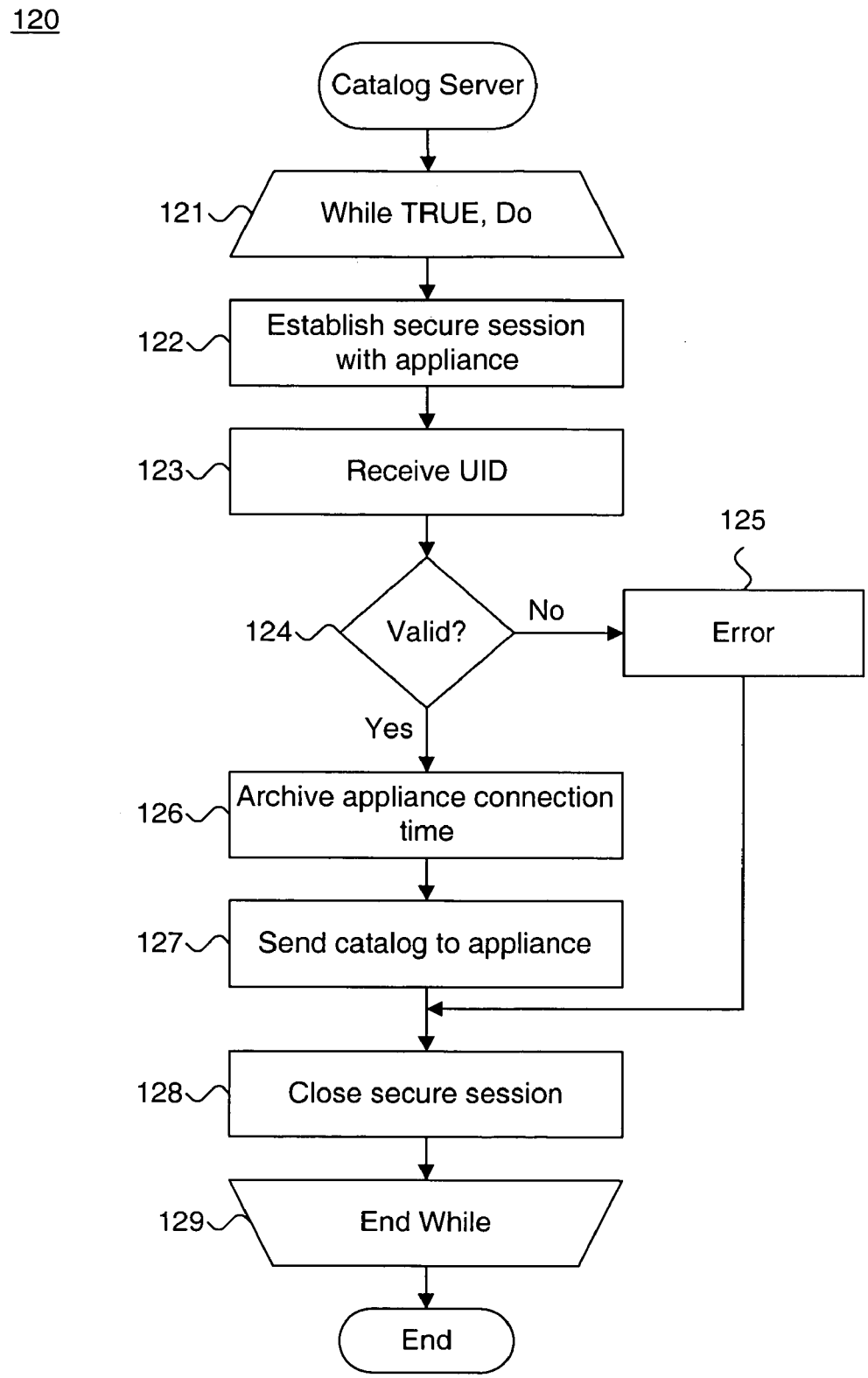
FIG. 8 is a flow diagram showing the process performed by the catalog server of FIG. 2.

FIG. 8 is a flow diagram 120 showing the process performed by the catalog server 15 of FIG. 2. The catalog server 15 executes an iterative processing loop (blocks 121–129). During each iteration (block 121), a secure session is established with a requesting appliance (block 122). Upon establishing a secure session, the catalog server 15 receives the user identification (UID) of the requesting appliance (block 123). If the user identification is not valid (block 124), an error condition is generated (block 125) and the administrator is notified. Otherwise, the connection time of the requesting appliance is archived (block 126) in the appliance status table 34 (shown in FIG. 2). A catalog is dynamically generated and sent to the requesting client (block 127). In the described embodiment, the catalog is generated as an XML document, although any other type of catalog description format could be used. The secure session is then closed (block 128). Processing continues (block 129) until the process is terminated.

Figure 9:
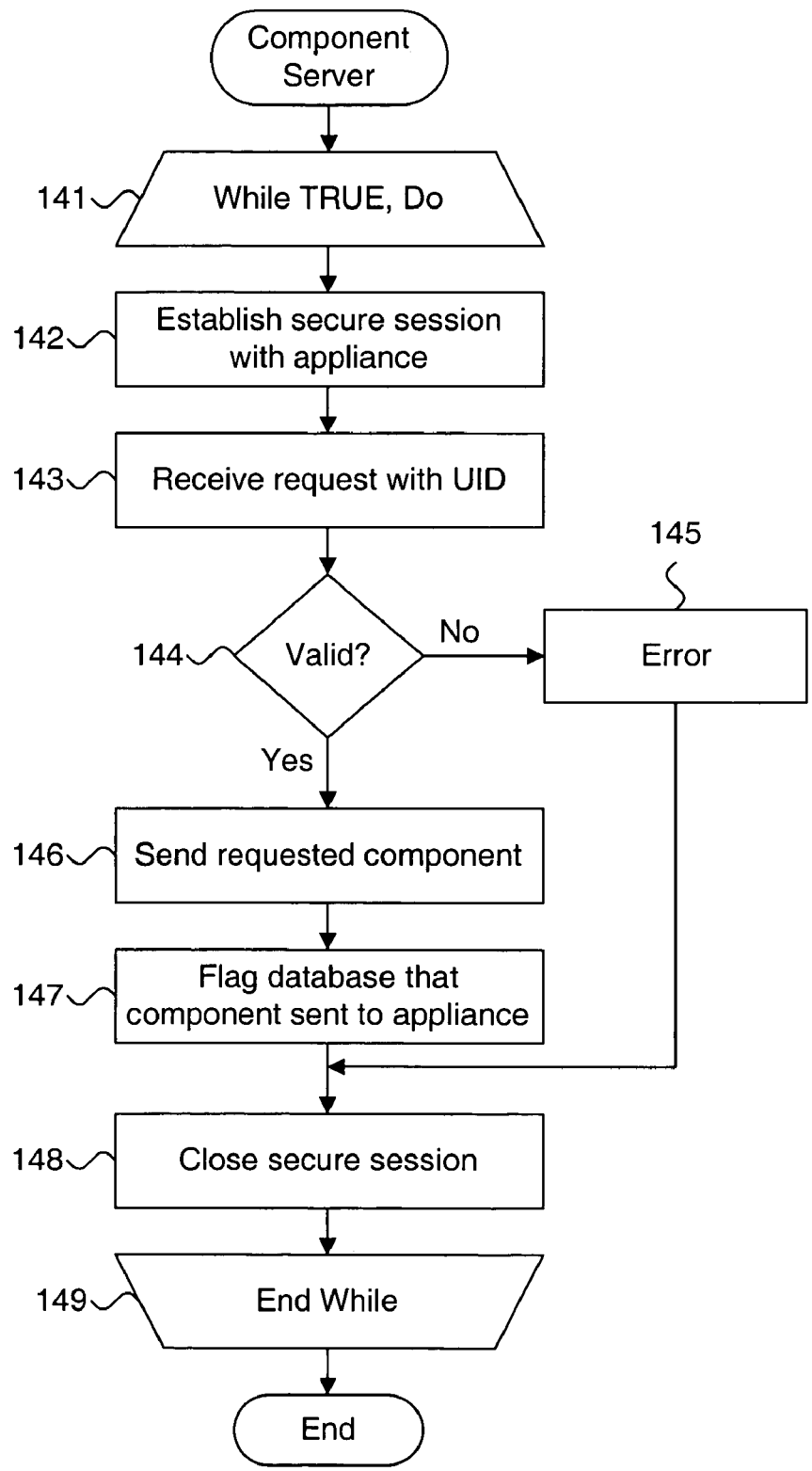
FIG. 9 is a flow diagram showing the process performed by the component server of FIG. 2.

FIG. 9 is a flow diagram 140 showing the process performed by the component server 16 of FIG. 2. The component server 16 executes an iterative processing loop (blocks 141–149). During each iteration (block 141), the component server 16 first establishes a secure session with the requesting appliance (block 142). The requesting appliance sends a request for an individual component to download which includes a user identifier (UID) and a URL indicating the location of the component to be downloaded. The request is received (block 143) and validated. If the user identification is not valid (block 144), an error condition is generated (block 145) and the administrator is notified. Otherwise, the requested component is downloaded to the requesting appliance (block 146) and the database is flagged to indicate that the downloaded component was sent to the requesting appliance (block 147). The component server 16 then closes the present session (block 148). Note a secure session is required for downloading files while a non-secure session is used when downloading packages. Processing continues (block 149) until the process is terminated or halted.

Figure 10A:
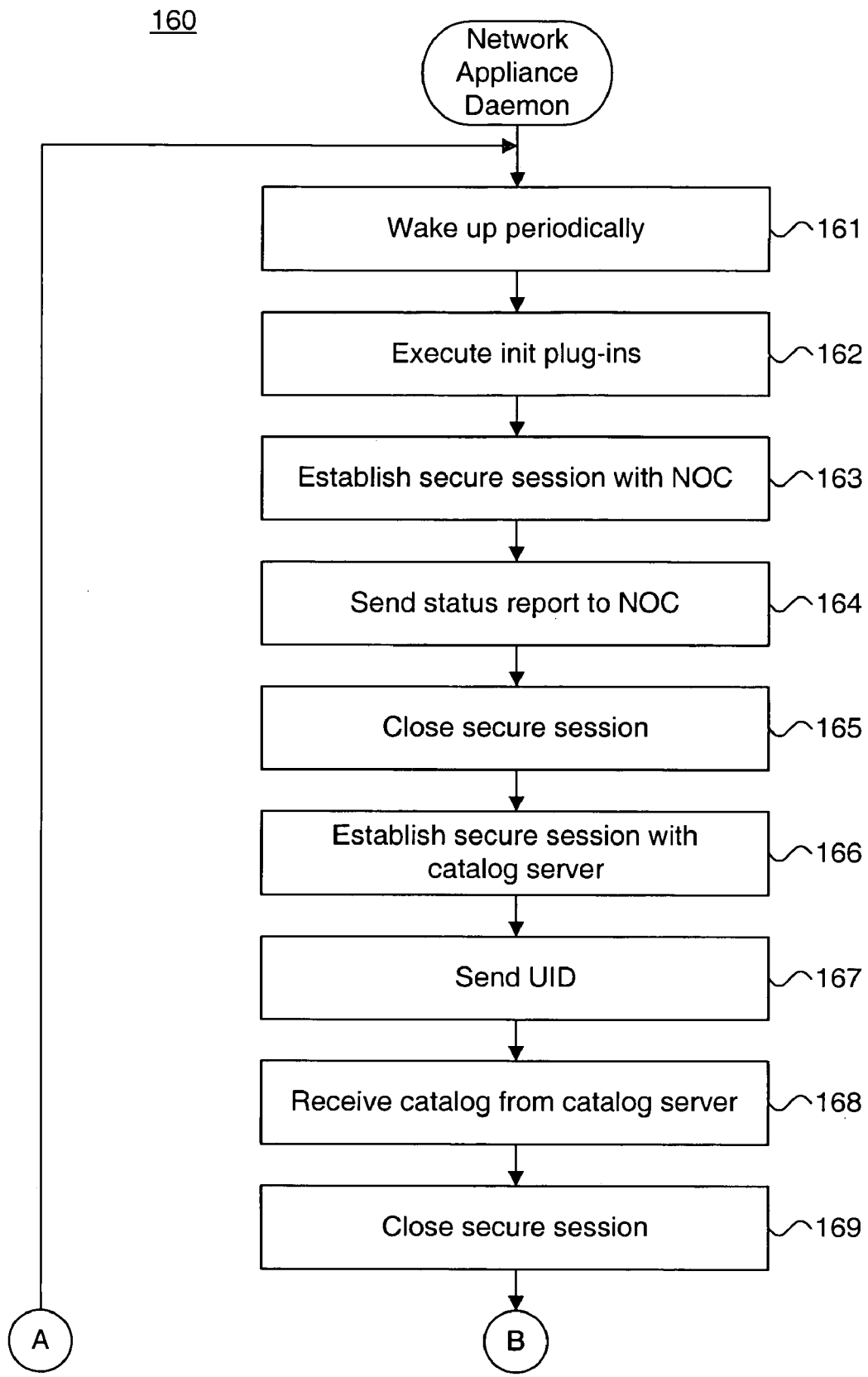
FIGS. 10A and 10B are flow diagrams showing the process performed by the network appliance of FIG. 3.
Figure 10B:
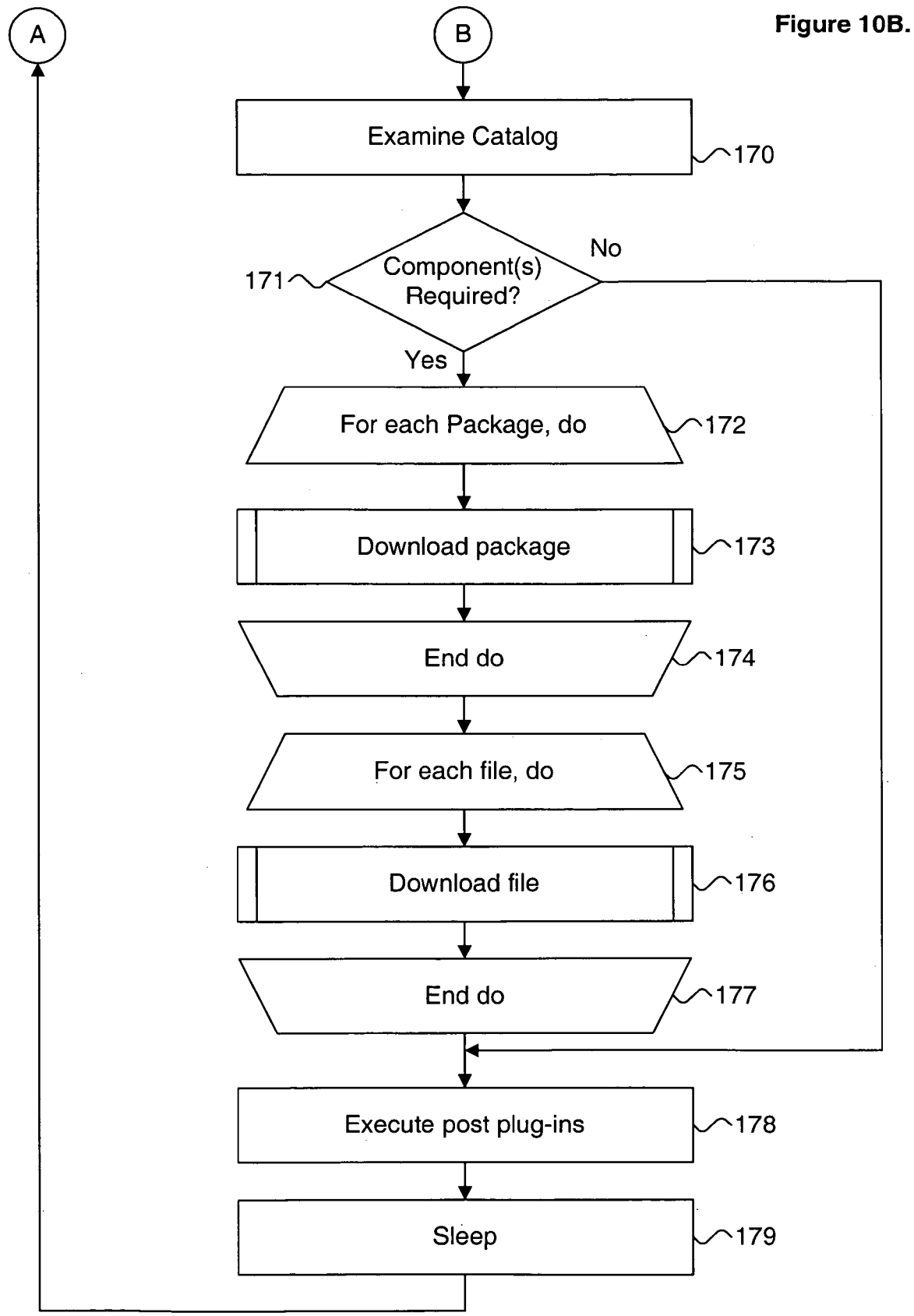

FIGS. 10A and 10B are flow diagrams 160 showing the process performed by the network appliance 11a of FIG. 3. Each network appliance 11a–c (shown in FIG. 1) periodically awakens, sends a status report, receives a catalog, and downloads any required packages and files. In addition, each network appliance 11a–c executes any initial plug-ins and post-plug-ins prior to and following the reporting and updating phase (shown in FIG. 4).

Thus, each network appliance 11a–c periodically awakens (block 161). In the described embodiment, each appliance 11a–c awakens once every 15 minutes, nine seconds. Any installed initial plug-ins are executed (block 162). By way of example, initial plug-ins include executables which monitor daemon processes, which must always be running. An initialization plug-in called "VScreen.init" executes as a watchdog process to determine if the daemon process is still running. The daemon process is restarted as necessary. As well, individual status reports are generated by the initial plug-ins, which must be executed prior to the reporting phase.

After executing any initial plug-ins, a secure session is established with the network operations center 12 (block 163) and the status report is sent (block 164). The secure session is then closed (block 165). A secure session is then established with the catalog server 16 (block 166) and the user identifier (UID) is sent (block 167). Upon validation by the catalog server 15, a dynamically-generated catalog is received from the catalog server 15 (block 168). The secure session is then closed (block 169).

Upon receiving the catalog from the catalog server 15, the catalog is examined (block 170). Each catalog includes a list of component names and versions, a tag indicating the server at which to locate and obtain the component, and the type of component, that is, package or file. If components are required (block 172), packages are first iteratively downloaded (blocks 172–174) followed by files (blocks 175–177). For each package (block 172), the package is downloaded (block 173), as further described below with reference to FIG. 11. Similarly, for each file (block 175), the file is downloaded (block 176), as further described below with reference to FIG. 12.

Upon completion of the downloading of each required package and file, any post plug-ins are executed (block 178). Finally, the network appliance returns to a sleep mode (block 179). Processing continues until the process is terminated or halted.

Figure 11:
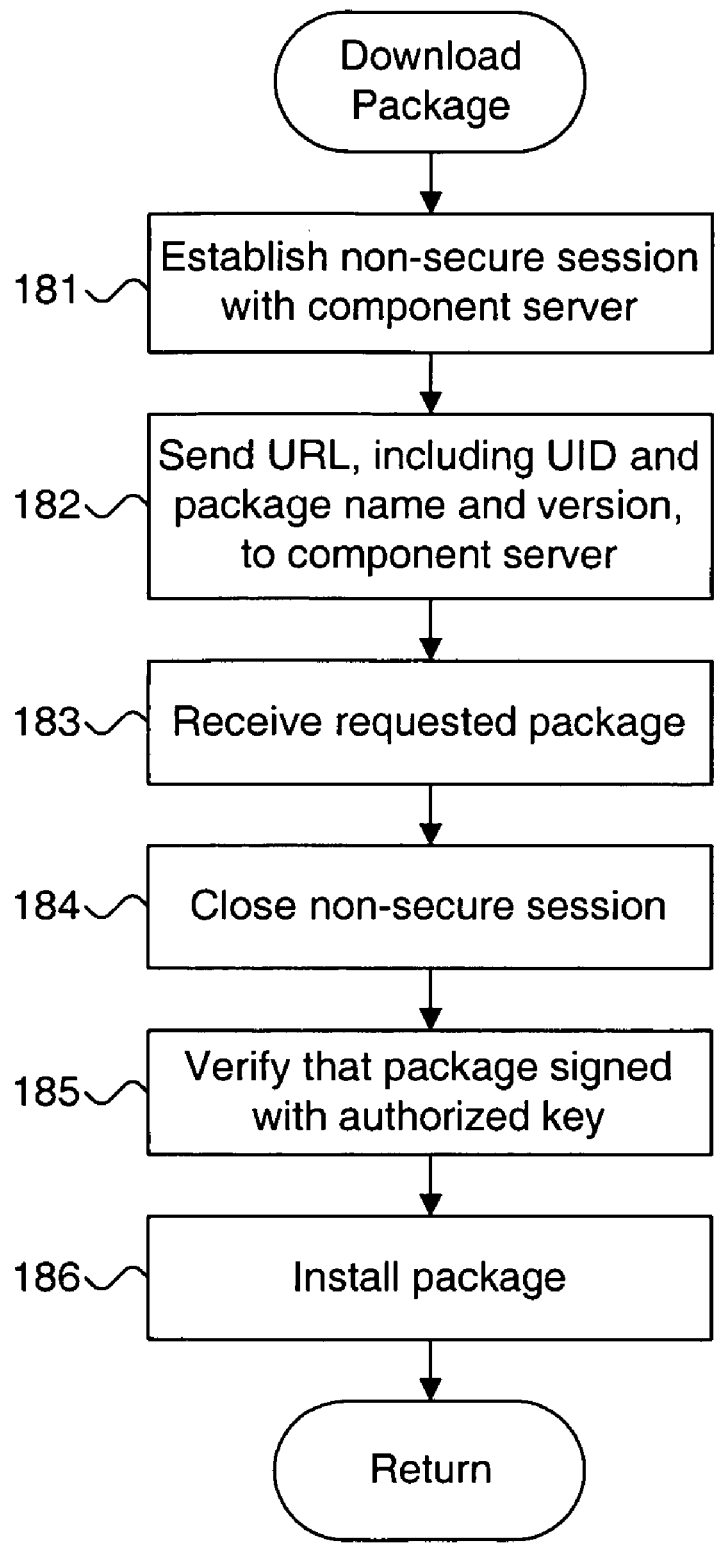
FIG. 11 is a flow diagram showing the routine for downloading a package for use in the process of FIGS. 10A and 10B.

FIG. 11 is a flow diagram 180 showing the routine for downloading a package for use in the process of FIGS. 10A and 10B. The purpose of this routine is to connect to the component server 16 and retrieve any required packages for installation by an appliance 11a.

Thus, a non-secure session is first established with the component server 16 (block 181). A Uniform Resource Locator (URL), including the user identifier (UID), package name and version, are sent to the component server 16 (block 182). Upon being credentialed by the component server, the requested package is received (block 183) and the non-secure session is closed (block 184).

Each individual package 57 is authenticated and encrypted by the network operations center 12 prior to being staged in the component database 17 of the component server 16. Accordingly, the downloading appliance 11a first verifies that the package was digitally signed with the private key for the network operations center 12 (block 185), after which the package is installed (block 186), following the instructions stored therein. The routine then returns.

Figure 12:
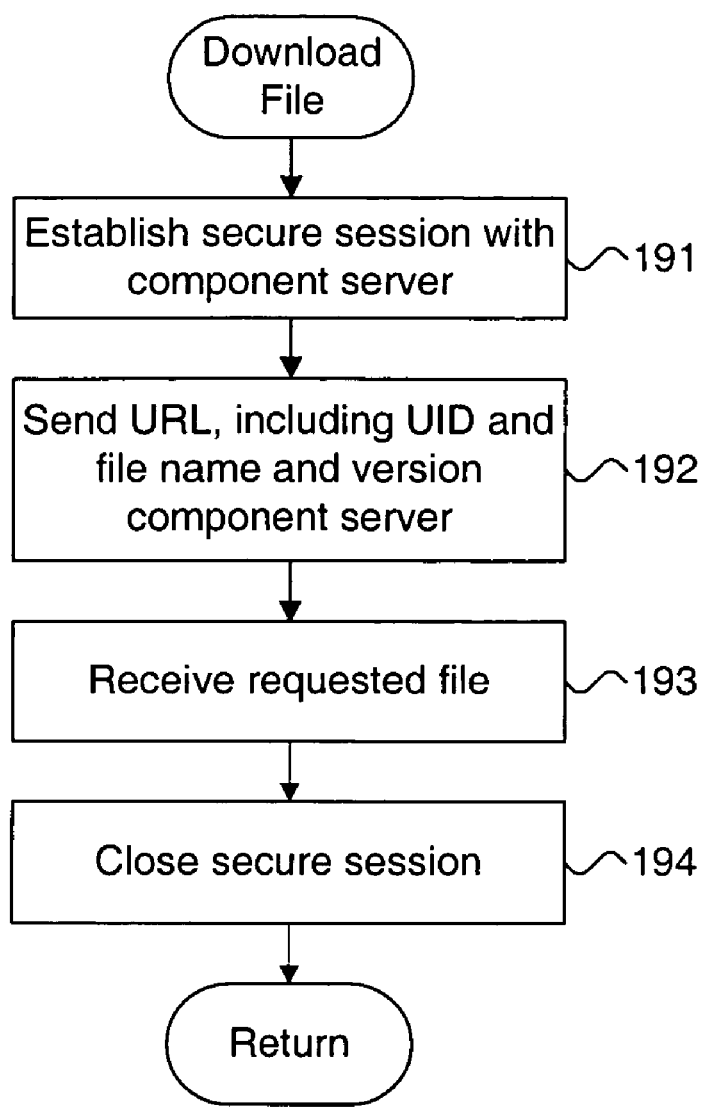
FIG. 12 is a flow diagram showing the routine for downloading a file for use in the method of FIGS. 10A and 10B.

FIG. 12 is a flow diagram 190 showing the routine for downloading a file 190 for use in the process of FIGS. 10A and 10B. The purpose of this routine is to connect to the component server 16 and retrieve any required files for installation by an appliance 11a. Each network appliance 11a–c connects to and downloads required files for installation per the instructions included in a file information subdirectory on the network operations center 12.

Thus, the network appliance 11a establishes a secure session with the component server 16 (block 191) and sends a uniform resource locator (URL), including user identifier (UID), file name and version, to the component server 16 (block 192). Upon being credentialed by the component server 16, the requested file is received (block 193), and the secure session is closed (block 194). The file is installed based on the information stored in the file information subdirectory (block 195). The routine then returns.

Figure 13:
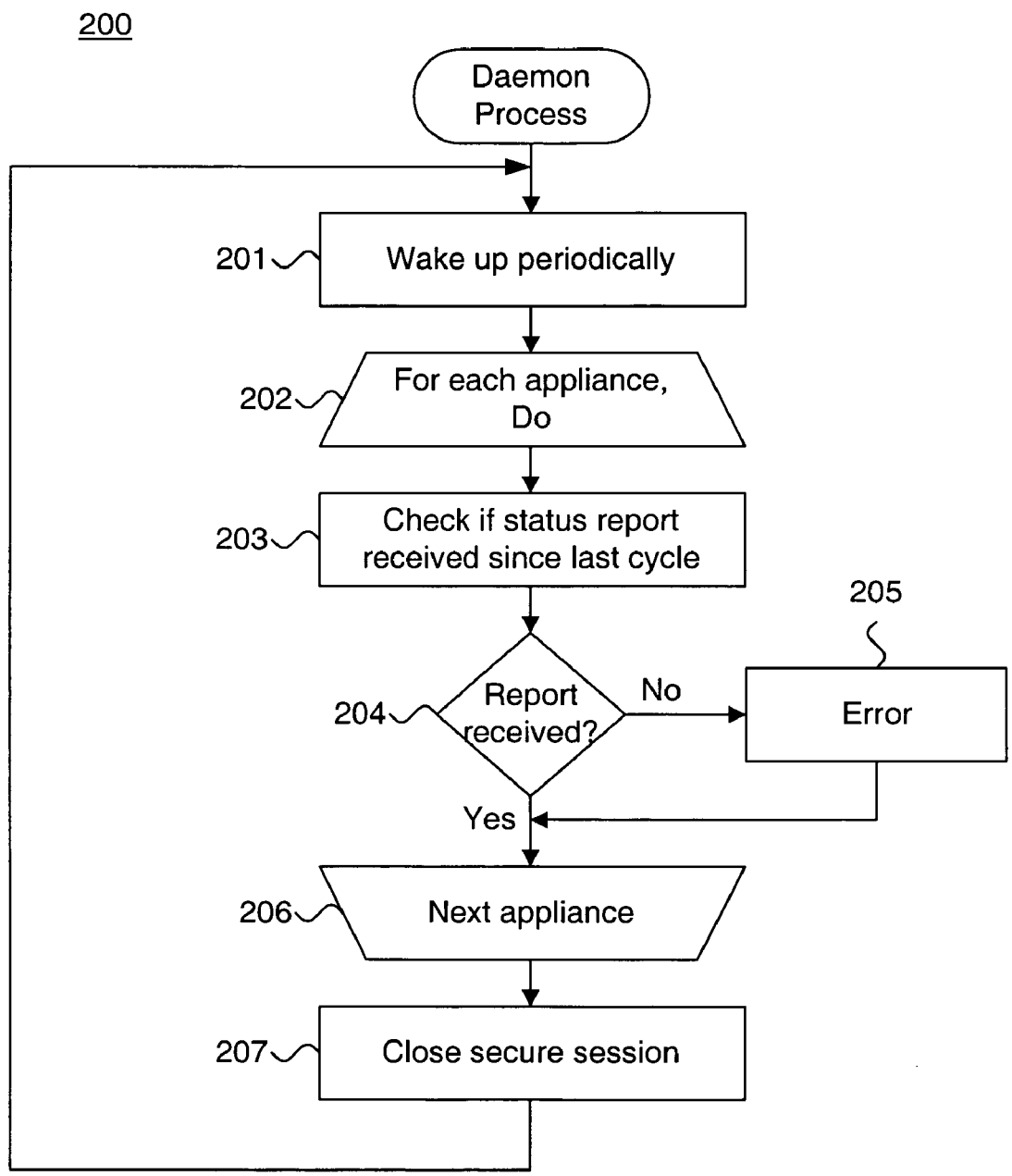
FIG. 13 is a flow diagram showing the daemon process performed by the network operations center of FIG. 2.

FIG. 13 is a flow diagram 200 showing the daemon process performed by the network operations center 12 of FIG. 2. The daemon process periodically awakens (block 201) and iteratively checks the status of each configured network appliance 11a–c (shown in FIG. 1) managed by the network operations center 12. During each iteration (block 202), the network operations center 12 determines whether a status report has been received from each of the appliances 11a–c since the last reporting cycle (block 203) by examining the appliance status table 34 (shown in FIG. 2). If a report has not been received (block 204), an error is generated (step 205) and the administrator is notified. Processing continues with each successive appliance (block 206), after which the daemon process returns to sleep (block 207).

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing a framework for network appliance management in a distributed computing environment, comprising:
   an appliance status table recording a status report periodically received from a status daemon autonomously operating on each of a plurality of network appliances, each status report containing health and status information and application-specific data pertaining to autonomous configuration and management of each network appliance; and
   a catalog server maintaining configuration settings for each network appliance progressively assembled concurrent to providing installable components and dynamically providing a catalog listing currently installable components for being installed on each network appliance based on the configuration settings independently received from the network appliance;
   wherein each network appliance, prior to sending the status report, executes at least one initial plug-in; and, after installing the installable components, executes at least one post-plug-in;
   wherein the at least one initial plug-in monitors the status daemon to determine if the status daemon is running, and restart the status daemon if it is determined that the status daemon is not running;
   wherein the catalog further includes installable component names, installable component versions, a tag indicating a component server at which to locate and obtain each installable component, and a type indicator indicating whether each installable component is a package or a file;
   wherein a network operations center establishes a secure session with each network appliance utilizing Secure Hypertext Transfer Protocol (HTTPS);
   wherein the appliance status table further records a user identifier associated with one of the network appliances from which the status report is received and a time the status report is received.

2. A system according to claim 1,
   wherein the network operations center installs an initial set of installable components on each network appliance during a bootstrap configuration.

3. A system according to claim 1, wherein the currently installable components comprise at least one self-installable package, and the component server supplies the at least one package for installation responsive to a request from one such network appliance.

4. A system according to claim 3, further comprising:
   a crypto module digitally signing the at least one package for the network operations center prior to being supplied for installation.

5. A system according to claim 3, further comprising:
   a crypto module encrypting the at least one package prior to being supplied for installation.

6. A system according to claim 1, wherein the installable components comprise at least one file, and the component server supplies the at least one file responsive to a request from one such network appliance.

7. A system according to claim 6, wherein the component server establishes the secure session prior to the at least one file being supplied for installation.

8. A system according to claim 6, further comprising:
   a file information subdirectory specifying installation instructions for the at least one file in a pre-determined entry prior to the at least one file being supplied for installation.

9. A system according to claim 1, further comprising:
   a proxy component server staging the currently installable components for retrieval in a separate components database.

10. A system according to claim 1, wherein the distributed computing environment is TCP/IP-compliant.

11. A system according to claim 1, wherein the status report contains machine-specific data including a load on a processor and available disk space associated with each network appliance, and the application-specific data includes a number of e-mails passing through each of a plurality of network devices.

12. A system according to claim 1, wherein the installable components for being installed on each network appliance are installed on each network appliance according to a location identified in a corresponding file information subdirectory of the network operations center.

13. A method for providing a framework for network appliance management in a distributed computing environment, comprising:
   recording a status report periodically received from a status daemon autonomously operating on each of a plurality of network appliances, each status report containing health and status information and application-specific data pertaining to autonomous configuration and management of each network appliance;
   maintaining configuration settings for each network appliance progressively assembled concurrent to providing installable components; and dynamically providing a catalog listing currently installable components for being installed on each network appliance based on the configuration settings independently received from the network appliance;

wherein each network appliance, prior to sending the status report, executes at least one initial plug-in; and, after installing the installable components, executes at least one post-plug-in;

wherein the at least one initial plug-in monitors the status daemon to determine if the status daemon is running, and restart the status daemon if it is determined that the status daemon is not running;

wherein the catalog further includes installable component names, installable component versions, a tag indicating a component server at which to locate and obtain each installable component, and a type indicator indicating whether each installable component is a package or a file;

wherein a secure session is established with each network appliance utilizing Secure Hypertext Transfer Protocol (HTTPS);

wherein a user identifier associated with one of the network appliances from which the status report is received and a time the status report is received are recorded.

14. A method according to claim 13, further comprising:
installing an initial set of installable components on each network appliance during a bootstrap configuration.

15. A method according to claim 13, wherein the currently installable components comprise at least one self-installable package, further comprising:
supplying the at least one package for installation responsive to a request from one such network appliance.

16. A method according to claim 15, further comprising:
digitally signing the at least one package prior to being supplied for installation.

17. A method according to claim 15, further comprising:
encrypting the at least one package prior to being supplied for installation.

18. A method according to claim 13, wherein the installable components comprise at least one file, further comprising:
supplying the at least one file responsive to a request from one such network appliance.

19. A method according to claim 18, further comprising establishing the secure session prior to the at least one file being supplied for installation.

20. A method according to claim 18, further comprising:
specifying installation instructions for the at least one file in a pre-determined entry prior to the at least one file being supplied for installation.

21. A method according to claim 13, further comprising:
staging the currently installable components for retrieval in a separate components database.

22. A method according to claim 13, wherein the distributed computing environment is TCP/IP-compliant.

23. A computer-readable storage medium holding code for performing the method according to claims 13, 14, 15, 16, 17, 18, 19, 20, 21, or 22.

24. A system for autonomously managing a network appliance deployed within a distributed computing environment, comprising:
an internal catalog of components installed on one such network appliance identified by component and version; and
a status daemon operating autonomously on the one such network appliance and periodically providing a status report containing health and status information and application-specific data pertaining to autonomous configuration and management of the one such network appliance; and
a catalog checker obtaining a catalog of currently installable components dynamically generated for the one such network appliance based on the status report independently received from the one such network appliance and determining non-current components by comparing the components and versions listed in the obtained catalog against the internal catalog;

wherein each network appliance, prior to sending the status report, executes at least one initial plug-in; and, after installing the installable components, executes at least one post-plug-in;

wherein the at least one initial plug-in monitors the status daemon to determine if the status daemon is running, and restart the status daemon if it is determined that the status daemon is not running;

wherein the catalog further includes a tag indicating a component server at which to locate and obtain each installable component, and a type indicator indicating whether each installable component is a package or a file;

wherein a network operations center negotiates a secure session with the one such network appliance utilizing Secure Hypertext Transfer Protocol (HTTPS);

wherein an appliance status table records a user identifier associated with the one such network appliance from which the status report is received and a time the status report is received.

25. A system according to claim 24, wherein the components comprise at least one self-installable package, further comprising:
an installer obtaining the at least one self-installable package and installing the at least one self-installable package per instructions encoded therein.

26. A system according to claim 25, wherein the components further comprise at least one file dependent on the at least one self-installable package, further comprising:
an installer obtaining the at least one file subsequent to installing the at least one self-installable package and installing the at least one self-installable package per instructions stored in a pre-determined entry.

27. A system according to claim 25, wherein the component server negotiates a non-secure session prior to obtaining the at least one self-installable package.

28. A system according to claim 25, further comprising:
a crypto module at least one of authenticating and decrypting the at least one self-installable package prior to installing the at least one self-installable package.

29. A system according to claim 25, wherein the instructions comprise an executable installation program plus one or more files to be installed.

30. A system according to claim 25, wherein the components further comprise at least one file, further comprising:
an installer obtaining the at least one file and installing the at least one self-installable package per instructions stored in a predetermined entry.

31. A system according to claim 30, wherein the component server negotiates the secure session prior to obtaining the at least one self-installable package.

32. A system according to claim 30, wherein the predetermined entry comprise a file information subdirectory identifying installation instructions.

33. A system according to claim 25, wherein at least one such network appliance performs one of electronic mail anti-virus scanning, content filtering, packet routing, and file, Web and print servicing.

34. A system according to claim 25, wherein the distributed computing environment is TCP/IP-compliant.

35. A method for autonomously managing a network appliance deployed within a distributed computing environment, comprising:
maintaining an internal catalog of components installed on one such network appliance identified by component and version;
periodically providing a status report containing health and status information and application-specific data pertaining to autonomous configuration and management of the one such network appliance and received from a status daemon autonomously operating on for the one such network appliance,
obtaining a catalog of currently installable components dynamically generated for the one such network appliance based on the status report independently received from the one such network appliance; and
determining non-current components by comparing the components and versions listed in the obtained catalog against the internal catalog;
wherein each network appliance, prior to sending the status report, executes at least one initial plug-in; and, after installing the installable components, executes at least one post-plug-in;
wherein the at least one initial plug-in monitors the status daemon to determine if the status daemon is running, and restart the status daemon if it is determined that the status daemon is not running;
wherein the catalog further includes a tag indicating a component server at which to locate and obtain each installable component, and a type indicator indicating whether each installable component is a package or a file;
wherein a secure session is negotiated with the one such network appliance utilizing Secure Hypertext Transfer Protocol (HTTPS);
wherein a user identifier associated with the one such network appliance from which the status report is received and a time the status report is received are recorded.

36. A method according to claim 35, further comprising:
broadcasting a query message to each such network appliance to trigger a status report.

37. A method according to claim 35, wherein the components comprise at least one self-installable package, further comprising:
obtaining the at least one self-installable package; and
installing the at least one self-installable package per instructions encoded therein.

38. A method according to claim 37, wherein the components further comprise at least one file dependent on the at least one self-installable package, further comprising:
obtaining the at least one file subsequent to installing the at least one self-installable package; and
installing the at least one self-installable package per instructions stored in a pre-determined entry.

39. A method according to claim 37, further comprising;
negotiating a non-secure session prior to obtaining the at least one self-installable package.

40. A method according to claim 37, further comprising:
at least one of authenticating and decrypting the at least one self-installable package prior to installing the at least one self-installable package.

41. A method according to claim 37, wherein the instructions comprise an executable installation program plus one or more files to be installed.

42. A method according to claim 35, wherein the components further comprise at least one file, further comprising:
obtaining the at least one file; and
installing the at least one self-installable package per instructions stored in a pre-determined entry.

43. A method according to claim 42, further comprising:
negotiating the secure session prior to obtaining the at least one self-installable package.

44. A method according to claim 42, wherein the pre-determined entry comprise a file information subdirectory identifying installation instructions.

45. A method according to claim 35, wherein at least one such network appliance performs one of electronic mail anti-virus scanning, content filtering, packet routing, and file, Web and print servicing.

46. A method according to claim 35, wherein the distributed computing environment is TCP/IP-compliant.

47. A computer-readable storage medium holding code for performing the method according to claims 35, 36, 37, 38, 39, 40, 41, 42, 43, 44, 45, or 46.

* * * * *

UNITED STATES PATENT AND TRADEMARK OFFICE
CERTIFICATE OF CORRECTION

PATENT NO. : 7,089,259 B1  
APPLICATION NO. : 10/056702  
DATED : August 8, 2006  
INVENTOR(S) : Kouznetsov et al.

It is certified that error appears in the above-identified patent and that said Letters Patent is hereby corrected as shown below:

col. 15, line 18 replace "appliance," with --appliance;--;  
    col. 16, line 14 replace "comprising;" with --comprising:--.

Signed and Sealed this

Ninth Day of February, 2010

David J. Kappos  
*Director of the United States Patent and Trademark Office*